United States Patent [19]

Mikami et al.

[11] Patent Number: 5,101,011
[45] Date of Patent: Mar. 31, 1992

[54] ALIGNING AGENT FOR LIQUID CRYSTALS COMPRISING POLY ALPHA-AMINO ACID HAVING NO OPTICAL ACTIVITY

[75] Inventors: Naoko Mikami; Takao Sakurai, both of Kanagawa, Japan

[73] Assignee: Ajinomoto Co., Inc., Tokyo, Japan

[21] Appl. No.: 554,861

[22] Filed: Jul. 20, 1990

[51] Int. Cl.$^5$ .............................. C08G 69/10
[52] U.S. Cl. .................. 528/328; 252/299.01; 430/20; 521/183; 528/310; 528/321; 528/330; 528/331; 530/300; 359/75
[58] Field of Search ............... 528/328, 310, 321, 330, 528/331; 521/183; 350/334; 530/300; 430/20; 252/299.01

[56] References Cited

U.S. PATENT DOCUMENTS

| | | | |
|---|---|---|---|
| 2,572,844 | 10/1951 | MacDonald | 528/328 |
| 2,590,642 | 3/1952 | Nichols | 528/328 |
| 2,671,772 | 3/1954 | MacDonald et al. | 528/328 |
| 3,076,790 | 2/1963 | Fox et al. | 528/328 |
| 3,331,814 | 7/1967 | Randall | 528/328 |
| 3,474,083 | 10/1969 | Shiga et al. | 528/328 |
| 3,499,874 | 3/1970 | Takahashi et al. | 528/328 |

*Primary Examiner*—Anderson: Harold D.
*Attorney, Agent, or Firm*—Oblon, Spivak, McClelland, Maier & Neustadt

[57] ABSTRACT

An aligning agent for liquid crystals containing a poly-amino acid having no optical activity.

9 Claims, 1 Drawing Sheet

ALIGNING AGENT FOR LIQUID CRYSTALS COMPRISING POLY ALPHA-AMINO ACID HAVING NO OPTICAL ACTIVITY

BACKGROUND OF THE INVENTION

1. Field of the Invention

The present invention relates to a liquid-crystal display device and to an aligning agent for liquid crystals.

2. Description of the Background

Twisted nematic (TN) and dynamic scatter (DS) types are the modes of liquid-crystal display elements extensively used at present. Because these liquid-crystal display modes have the disadvantages of small visual angle and low contrast, supertwisted nematic (STN) and thin-film transistor (TFT) types have appeared on the market in recent years as new display modes. These new modes all employ nematic liquid-crystal cells, and hence it is inevitable that the response speed is on the order of milliseconds. In order to solve this problem, studies are actively under way on the display mode using ferroelectric liquid crystals whose response speed is as high as on the order of microseconds. The system of thermal writing in smectic A phase is also known, which features high-precision display.

In these liquid-crystal display devices, the molecules of liquid crystals involved are oriented in a specific direction, and display is effected by applying a voltage upon the oriented molecules to change the orientation. A thin film (called the aligning layer) is formed on each electrode to orient the molecules of liquid crystals in the display device in a specific direction. The material of aligning agent for liquid crystals comprised in the aligning layer is of two types: one is an organic polymer, and the other is an obliquely deposited inorganic oxide. The mechanism of the aligning agent or orientator comprising an organic polymer is described by J. M. Geary, et al. (Journal of Applied Physics, 15, Nov., 1987). In the latter case, the inorganic oxide is deposited onto the electrode in a specific direction to form a small column made of the oxide on the electrode, thereby orienting the liquid crystal molecules along this column. Polyimides and other organic polymers are widely used as aligning agents made of the organic polymer, while silicon dioxide and other inorganic oxides are mainly studied as that made of the inorganic oxide.

Polyimides and other organic polymers are now widely used as the aligning agent in nematic liquid-crystal cells. A polymer is dissolved in a common solvent at a proper concentration, the solution thus obtained is applied on the electrode by spin coating or dipping to form a thin film tens to thousands Å thick, and the formed film is rubbed with a sheet of cloth or the like to become oriented along a specific axis, thus giving a large area of aligning layer rather easily. Of the organic polymers, polyimides have been extensively studied as an aligning agent in ferroelectric liquid-crystal display devices. However, when polyamides are used, it is not possible to obtain high contrast. Further, defects tend to form and memory is hard to reproduce because the liquid crystal molecules in the display device are subject to twist or splay orientation in contrast to the orientation direction indicated by the aligning layer (the axial direction of the molecules gradually deviates from the indicated direction as the molecules approach the inside of the cell from the electrode).

In an effort to overcome these disadvantages, studies have been made on orientation by oblique deposition of an inorganic oxide, but this method is not amenable to industrialization because it is difficult to produce cells of large area. For these reasons, there has been a demand for the development of an aligning agent for liquid crystals made of an organic polymer with excellent characteristics. The display mode of the supertwisted nematic type has also demanded an aligning agent for liquid crystals which will provide display devices of little display unevenness, high contrast and low dependence on visual angle. In ferroelectric liquid-crystal cells, in particular, memory characteristics, high contrast, dependence on visual angle and other important characteristics are dictated by the aligning layer used. Hence, there has been a demand for the development of an excellent aligning agent for liquid crystals in both the nematic and smectic type display modes.

As an example of organic polymers employed as an aligning agent for liquid crystals, is known an optically active polyamino acid (disclosed in Japanese Patent Publication No. 35780/1979). Since the formed aligning layer itself is optically active in this case, the director of liquid crystal molecules tends to tilt from the direction indicated by the aligning direction in nematic liquid-crystal display devices; and when this type of polymer is used in ferroelectric liquid-crystal cells, high contrast and stable memory characteristics cannot be achieved, because the layered structure of liquid crystal molecules tends to tilt from the direction indicated by the aligning agent and uniform orientation is hardly ensured. In addition, optically active polyamino acids, which are likely to assume an α-helical structure, are sparingly soluble in common solvents, and hence a special solvent, such as trifluoroacetic acid, has to be used.

Hence, a need continues to exist for polymers which can act as an aligning agent for liquid crystals, and which provide good memory characteristics and uniform orientation to ensure high contrast in ferroelectric liquid-crystal cells.

SUMMARY OF THE INVENTION

Accordingly, it is an object of the present invention to provide an organic polymer which is effective as an aligning agent for liquid crystals.

It is also an object of this invention to provide a liquid-crystal display device which includes a liquid-crystal layer and an orientation membrane layer containing the aligning agent.

The above objects and others which will become more apparent in view of the following are provided by an aligning agent for liquid crystals containing a polyamino acid having no optical activity.

DETAILED DESCRIPTION OF THE PREFERRED EMBODIMENT

Figure 1:
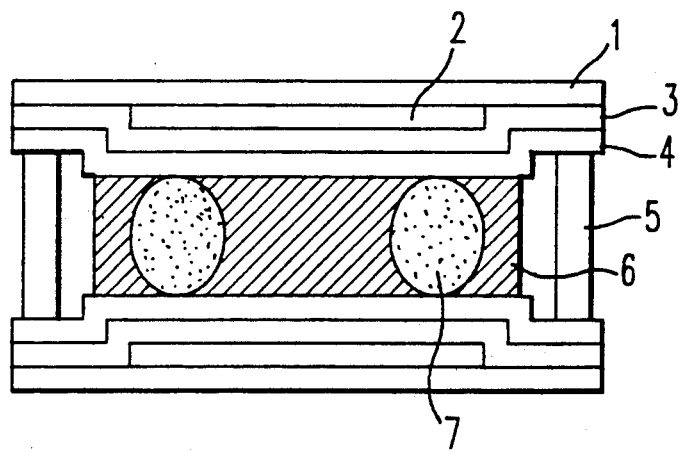
FIG. 1 illustrates a sectional view of an example of the liquid-crystal display device of the present invention.

The present invention provides organic polymers as aligning agents or orientators for liquid crystals, which provide satisfactory orientation to nematic liquid crystals and smectic liquid crystals (containing ferroelectric liquid crystals), and which provide good memory characteristics and uniform orientation to ensure high contrast in ferroelectric electric liquid-crystal cells.

In more detail, the present invention relates to an operator for liquid crystals comprising a polyamino acid with no optical activity composed of the structural unit represented by the following formula (I):

$$-\{NH-CH(R)-(CH_2)_m-CO\}_n- \quad (I)$$

wherein m is an integer of 0 to 3, R is hydrogen atom or a linear or branched alkyl group having from 1 to 8 carbon atoms in which at least one methylene group may optionally be replaced by $-O-$, $-OCO-$, $-COO-$, $-S-$, $-NH-$, $-CO-$, aryl radical, a halogenated aryl radical or a heterocyclic ring, and n is 5 to 10,000. The present invention also relates to a liquid-crystal display device using the same. The polyamino acid with no optical activity herein means homopolymers and copolymers composed of at least one type of structural unit represented by formula (I) and compositions using the same. The amino acids constituting said polyamino acid include d-, l- and racemic amino acids and those having no asymmetric carbon atom (such as glycine). Any copolymer comprising d- or l-amino acids may be used for the purpose of invention so long as the whole polymer is not optically active even when part of the polymer exhibits optical activity.

As examples of the amino acids may be used are glycine, alanine, leucine, isoleucine, aminobutyric acid, asparagine, aspartic acid, azaserine, allo-isoleucine, allothreonine, arginine, ethionine, ergothioneine, ornithine, canavanine, carboxymethylcysteine, kynurenine, glutamine, glutamic acid, cystathionine, cysteine, cysteic acid, cystine, citrulline, dihydroxphenylalanine, 3,5-diiodotyrosine, serine, thyroxine, tyrosine, tryptophan, threonine, norvaline, norleucine, valine, histidine, hydroxyproline, phenylalanine, α-phenylglycine, homoserine, methionine, 1-methylhistidine, lanthionine and lysine (including α-, β- and γ-amino acids). The polyamino acids represented by the formula (I) are homopolymers and copolymers of these amino acids.

The optically inactive polyamino acids of the formula (I) are prepared by producing N-carboxy anhydride (NCA) of each amino acid through the phosgenation method or through action of phosphorus tribromide, phosphorus pentachloride or thionyl chloride upon N-alkoxycarbonyl derivative of the amino acid, followed by addition of a polymerization initiator, or by subjecting hydrochlorides of amino acid chlorides to heat polymerization. Polyamin acids of different molecular weights can be obtained by using the polymerization initiator in different amounts.

The polyamino acid thus obtained is dissolved in a common solvent, such as dimethylformamide, perclene, ethylene dichloride, water and N-methylpyrrolidone, at a concentration of 0.1 to 5%, the solution is applied on electrodes by spin coating or dipping, and the solvent is evaporated by heating, giving a thin film tens to thousands Å thick. These membranes are gently rubbed with a sheet of cloth or the like several times to cause orientation along a specific axis, and two pieces of the electrodes having aligning layer thus obtained are piled one upon another with a spacer several microns thick being put between the two bases, forming a liquid-crystal display device as shown in FIG. 1.

The polymer of the present invention, when used as an aligning agent provided on the electrodes in a liquid-crystal display device, shows the effect of uniformly orienting the liquid crystal molecules. In a nematic liquid-crystal display device using the aligning agent of this invention, the director of liquid crystal molecules will not tilt from the indicated direction but will become oriented parallel or perpendicular, because the aligning layer is not optically active. In a ferroelectric liquid-crystal display device using an aligning agent of this invention, particularly when the polyamino acid has short side chains, the liquid crystal molecules will not twist but will become uniformly oriented from the upper electrode to the lower one and this ensures high contrast of the display device. The aligning agent for liquid crystals of this invention is also excellent as a perpendicular aligning agent when a polyamino acid having linear or branched alkyl groups of at least four carbon atoms as side chains is used, it has the effect of aligning the liquid crystal molecules perpendicular to the electrodes. Optically active polyamino acids are sparingly soluble in commonly used solvents and hence a special solvent, such as trifluoroacetic acid, has to be used. In contrast, the optically inactive polyamino acids of this invention are readily soluble in common solvents (which are not acids or bases). In addition, the fact that the direction of liquid crystals molecules to the electrodes can be freely adjusted (from homogeneous to homeotropic alignment) by changing the length and size of the side chains on the polyamino acid is an additional advantage of this invention.

The present invention will now be further illustrated by reference to certain examples which are provided solely for purposes of illustration and are not intended to be limitative.

EXAMPLE 1

Poly-DL-leucine was completely dissolved in perclene at a concentration of 0.5 weight %, the solution was filtered though a 0.5 μm filter, and the filtrate was applied on two electrodes by spin coating (3000 rpm×40 seconds), followed by drying at 90° C. for 30 minutes to evaporate the solvent, affording a thin film about 700 Å thick. The two bases were then piled one upon another with a spacer being put between the same, forming a liquid-crystal display cell with a cell thickness of about 2 μm. When a smectic liquid-crystal composition S2 (product of Merck) was injected into this display element, very uniform homeotropic alignment was observed.

EXAMPLE 2

Poly-DL-alanine was completely dissolved in perclene at a concentration of 0.5 weight %, the solution was filtered through a 0.5 μm filter, and the filtrate was applied on two electrodes by spin coating (1500 rpm×60 seconds), followed by drying at 90° C. for 30 minutes to evaporate the solvent, affording a thin film about 200 Å thick. The membranes thus formed were rubbed in a specific direction, and the two electrodes were piled one upon another with a spacer being put between the same, forming a liquid-crystal display cell with a cell thickness of about 2 μm. When a ferroelectric liquid-crystal composition was injected into this display cell, uniform orientation was observed over the whole area.

EXAMPLE 3

Poly-DL-alanine was completely dissolved in perclene at a concentration of 0.5 weight %, the solution was filtered through a 0.5 μm filter, and the filtrate was applied on two electrodes by spin coating (1500 rpm×60 seconds), followed by drying at 90° C. for 30 minutes to evaporate the solvent, giving thin film about 200 Å thick. The membranes thus formed were rubbed in a specific direction, and the two electrodes were piled one upon another with a spacer being put between the same, forming a liquid-crystal display cell with a cell thickness of about 2 μm. When a nematic liquid-crystal composition TN-619 (product of Roche) was injected into this display element, homogeneous alignment was observed over the whole area.

The alignment agent for liquid crystals of the present invention, when used as an aligning layer, provides satisfactory orientation to nematic liquid-crystal display devices and smectic liquid-crystal display devices (containing ferroelectric liquid-crystal display devices). It provides uniform orientation to ensure high contrast particularly when used in ferroelectric liquid-crystal display devices. In addition, the aligning agent for liquid crystals of this invention in which the polyamino acid carries linear or branched alkyl groups of at least four carbon atoms as side chains is also excellent as a homeotropic aligning agent. Furthermore, the aligning agent for liquid crystals of this invention will not assume an α-helical structure because of the optical inactivity and are hence readily soluble in common solvents, which is an excellent effect of practical value.

With respect to FIG. 1, element (1) is a glass base, element (2) is a transparent electrode, element (3) is an overcoat membrane, element (4) is an aligning layer, element (5) is an adhesive layer, element (6) is a liquid-crystal layer, and element (7) is a spacer.

Having described the present invention, it will be apparent to one of ordinary skill in the art that many changes and modifications may be made to the above-described embodiments without departing from the spirit and scope of the present invention.

What is claimed as new and desired to be secured by Letters Patent of the United States is:

1. A liquid-crystal display device, which comprises a liquid-crystal layer and an orientation membrane layer containing a polyamino acid having no optical activity.

2. The liquid-crystal display device of claim 1, wherein said polyamino acid has repeating units of the formula:

$$\{NH-CH(R)-(CH_2)_m-CO\}_n$$

wherein m is an integer of 0 to 3, R is a hydrogen atom or a linear or branched alkyl group having from 1 to 8 carbon atoms, or in which at least one methylene group thereof is replaced by —O—, —OCO—, —COO—, —S—, —NH—, —CO—, arylene radical a halogenated arylene radical or a heterocyclic ring, and n is an integer of 5 to 10,000.

3. The liquid-crystal display device of claim 1, wherein the polyamino acid is produced from d- l- or racemic amino acids or amino acids having no asymmetric carbon atom.

4. The liquid-crystal display device of claim 1, wherein said polyamino acid is a homopolymer or a copolymer.

5. The liquid-crystal display device of claim 1, wherein said amino acids are selected from the group consisting of glycine, alanine, leucine, isoleucine, aminobutyric acid, asparagine, aspartic acid, azaserine, allo-isoleucine, allo-threonine, arginine, ethionine, ergothioneine, ornithine, canavanine, carboxymethylcysteine, kynurenine, glutamine, glutamic acid, cystathionine, cysteine, cysteic acid, cystine, citrulline, dihydroxphenylalanine, 3,5-diiodotyrosine, serine, thyroxine, tyrosine, tryptophan, threonine, norvaline, norleucine, valine, histidine, hydroxyproline, phenylalanine, α-phenylglycine, homoserine, methionine, 1-methylhistidine, lanthionine and lysine.

6. The liquid-crystal display device of claim 1, which is a ferroelectric liquid-crystal display element.

7. The liquid-crystal display device of claim 1, wherein said polyamino acid is poly-DL-leucine.

8. The liquid-crystal display device of claim 1, wherein said polyamino acid is poly-DL-alanine.

9. The liquid-crystal display device of claim 5, wherein said amino acids are α-, β- or γ-amino acids.

* * * * *

UNITED STATES PATENT AND TRADEMARK OFFICE
CERTIFICATE OF CORRECTION

PATENT NO. : 5,101,011
DATED : March 31, 1992
INVENTOR(S) : Naoko Mikami et al.

It is certified that error appears in the above-identified patent and that said Letters Patent is hereby corrected as shown below:

On the Title page, item [30],
The foreign application priority data has been omitted, should be, --July 20, 1989 [JP] Japan...............1-188579--.

Signed and Sealed this

Fifteenth Day of June, 1993

Attest:

MICHAEL K. KIRK

Attesting Officer

Acting Commissioner of Patents and Trademarks